US010770935B2

(12) United States Patent
Miyamoto et al.

(10) Patent No.: US 10,770,935 B2
(45) Date of Patent: Sep. 8, 2020

(54) ROTOR

(71) Applicant: TOYOTA JIDOSHA KABUSHIKI KAISHA, Toyota-shi, Aichi-ken (JP)

(72) Inventors: Tomohiko Miyamoto, Nagakute (JP); Meiou Gi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 40 days.

(21) Appl. No.: 16/137,715

(22) Filed: Sep. 21, 2018

(65) Prior Publication Data

US 2019/0097476 A1 Mar. 28, 2019

(30) Foreign Application Priority Data

Sep. 26, 2017 (JP) ................................ 2017-184694

(51) Int. Cl.
*H02K 1/22* (2006.01)
*H02K 15/02* (2006.01)
*H02K 1/28* (2006.01)

(52) U.S. Cl.
CPC ................ *H02K 1/22* (2013.01); *H02K 1/28* (2013.01); *H02K 15/02* (2013.01); *H02K 2213/03* (2013.01)

(58) Field of Classification Search
CPC ........... H02K 1/22; H02K 1/28; H02K 15/02; H02K 2213/03
See application file for complete search history.

(56) References Cited

U.S. PATENT DOCUMENTS 10,128,704 B2 * 11/2018 Okochi ................ H02K 1/2766
2010/0237725 A1 * 9/2010 Tatematsu .............. B60L 50/66 310/61
2013/0221772 A1 8/2013 Miyamoto et al.
2017/0047827 A1 * 2/2017 Fubuki ................ H02K 15/028
2018/0062463 A1 * 3/2018 Ito ....................... H02K 1/2766

FOREIGN PATENT DOCUMENTS

CN 106451955 A 2/2017
JP 2013-183480 A 9/2013

* cited by examiner

*Primary Examiner* — Mohamad A Musleh
(74) *Attorney, Agent, or Firm* — Oliff PLC

(57) ABSTRACT

A rotor includes: a shaft provided with a flange which projects outward in a radial direction from an outer peripheral surface of the shaft; and a rotor core formed by laminating a plurality of electromagnetic steel sheets, the rotor core being fitted on the outer peripheral surface of the shaft such that an axial-direction end surface of the rotor core is in contact with the flange. An annular recessed portion is formed on the outer peripheral surface of the shaft at a portion adjacent to a surface of the flange on a side of the rotor core, and two or more of the electromagnetic steel sheets positioned above the annular recessed portion and other electromagnetic steel sheets are joined to each other so as to form an integral body.

1 Claim, 5 Drawing Sheets

100 B 31 30 32 24 S 50 22 20 25 21 13 26 15 17 11 16 10 14 23 AXIAL DIRECTION 18 RADIAL DIRECTION ONE END SIDE A THE OTHER END SIDE 24 50 d S L2 25 13 22 11 21 10 25 23,23a H1 ONE END SIDE THE OTHER END SIDE 14 L1 AXIAL DIRECTION DETAIL OF PORTIONS A, B RADIAL DIRECTION

ROTOR

CROSS REFERENCE TO RELATED APPLICATION

The disclosure of Japanese Patent Application No. 2017-184694 filed on Sep. 26, 2017 including the specification, claims, drawings, and abstract is incorporated herein by reference in its entirety.

TECHNICAL FIELD

This disclosure generally relates to a rotor of a rotary electric machine, and more particularly to a fixing structure between a rotor core and a shaft.

BACKGROUND

In a rotary electric machine such as a motor, a rotor is used where a rotor core, which is formed by laminating electromagnetic steel sheets to each other, is fitted on a shaft having a flange, and the rotor core is fixed by fastening using a nut from a side opposite to the flange. In the rotor having such a configuration, an axial-direction end surface of the rotor core comes into contact with an end surface of the flange on a side of the rotor core (see JP 2013-183480 A, for example).

SUMMARY

An annular recessed portion may be formed on an outer peripheral surface of a shaft at a portion in the vicinity of a root of a flange. For example, the annular recessed portion is formed to reduce a stress on the flange, or to relieve a processing tool used in manufacturing a flange and a shaft by cutting. In this case, there is a possibility that any of the electromagnetic steel sheets positioned above the annular recessed portion may be displaced in the radial direction, so that an outer periphery of the electromagnetic steel sheets interferes with an inner peripheral surface of a stator.

In view of the above, an advantage of this disclosure is to suppress the radial displacement of an electromagnetic steel sheet positioned above the annular recessed portion formed on a shaft in a rotor of a rotary electric machine.

Solution to Problem

This disclosure provides a rotor which includes: a shaft provided with a flange which projects outward in a radial direction from an outer peripheral surface of the shaft; and a rotor core formed by laminating a plurality of electromagnetic steel sheets, the rotor core being fitted on the outer peripheral surface of the shaft such that an axial-direction end surface of the rotor core is in contact with the flange, wherein an annular recessed portion is formed on the outer peripheral surface of the shaft at a portion adjacent to a surface of the flange on a side of the rotor core, and two or more of the electromagnetic steel sheets positioned above the annular recessed portion and other electromagnetic steel sheets are joined to each other so as to form an integral body.

Other electromagnetic steel sheets, which is fitted on the outer surface of the shaft excluding the recessed portion, and two or more of the electromagnetic steel sheets, which is positioned above the annular recessed portion thus not being fitted on the shaft, are joined to each other so as to form an integral body. With such a configuration, a position in the radial direction of the electromagnetic steel sheet, positioned above the annular recessed portion, is restricted by other electromagnetic steel sheets fitted on the outer peripheral surface of the shaft. Accordingly, it is possible to suppress the radial movement of the electromagnetic steel sheets positioned above the annular recessed portion.

In the rotor of this disclosure, two or more of the electromagnetic steel sheets positioned above the annular recessed portion and other electromagnetic steel sheets may be joined to each other in a lamination direction by welding such that welding extends over two or more the electromagnetic steel sheets positioned above the annular recessed portion and other electromagnetic steel sheets, and a length of the welding may be larger than a length of the recessed portion in an axial direction.

With the use of simple means of welding, two or more of the electromagnetic steel sheets positioned above the annular recessed portion and other electromagnetic steel sheets can be joined to each other so as to form an integral body.

Advantageous Effects of Invention

This disclosure can suppress the radial displacement of an electromagnetic steel sheets positioned above an annular a recessed portion formed on a shaft in a rotor of a rotary electric machine.

BRIEF DESCRIPTION OF DRAWINGS

Embodiments of the present disclosure will be described by reference to the following figures, wherein.

DESCRIPTION OF EMBODIMENTS

Hereinafter, a rotor 50 of an embodiment is described with reference to drawings. First, the structure of a motor 100 into which the rotor 50 of the embodiment is incorporated is described with reference to FIG. 1.

Figure 1:
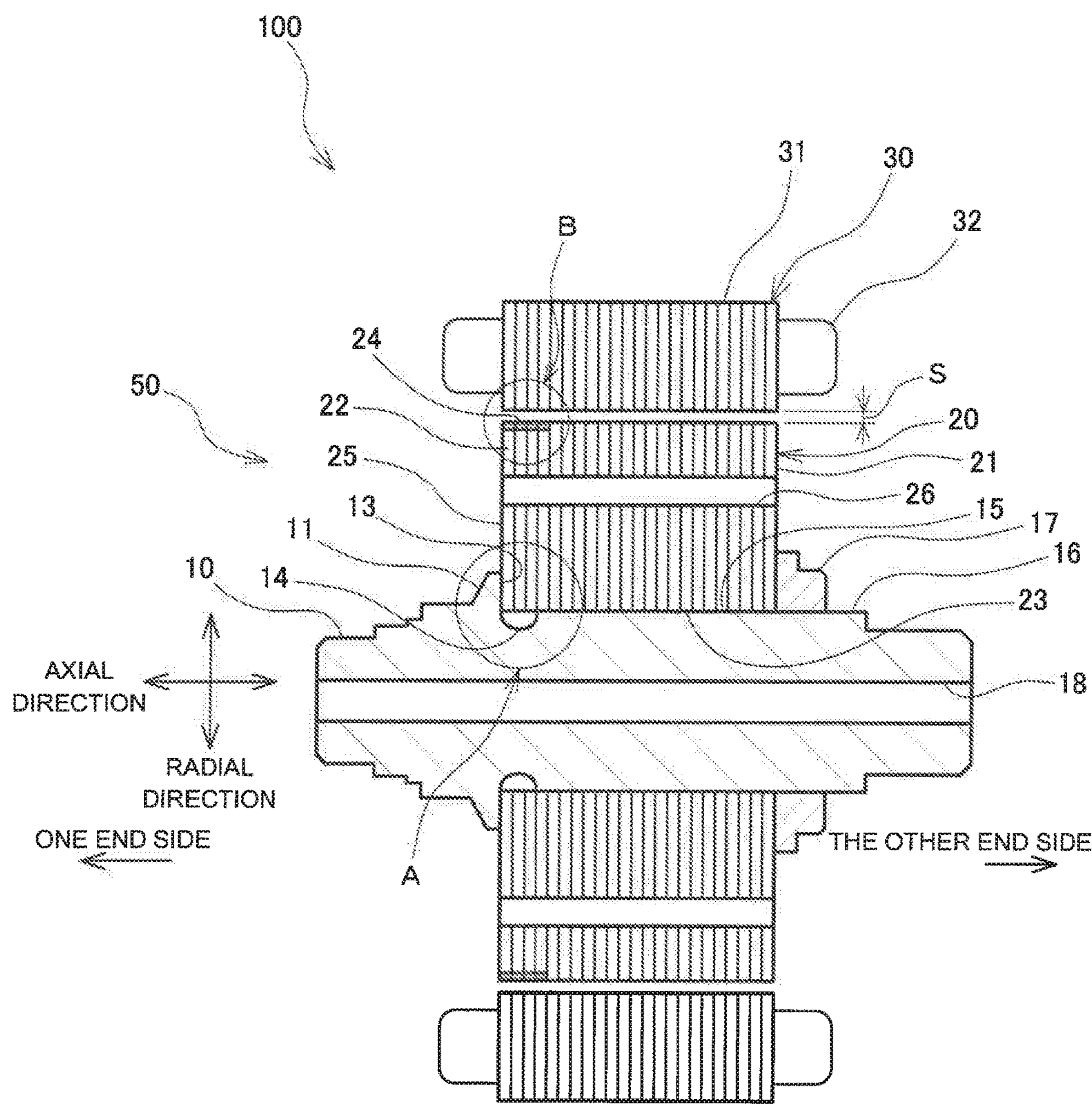
FIG. 1 is a schematic cross-sectional view of a motor into which a rotor of an embodiment is incorporated.

As shown in FIG. 1, the motor 100, which is one example of a rotary electric machine, includes the rotor 50 and a stator 30. The rotor 50 is formed of a shaft 10 and a rotor core 20. The stator 30 is formed of a stator core 31, and a coil 32 wound around the stator core 31. An air gap S is formed between an outer periphery of the rotor core 20 and an inner periphery of the stator core 31.

Figures 3A, 3B:
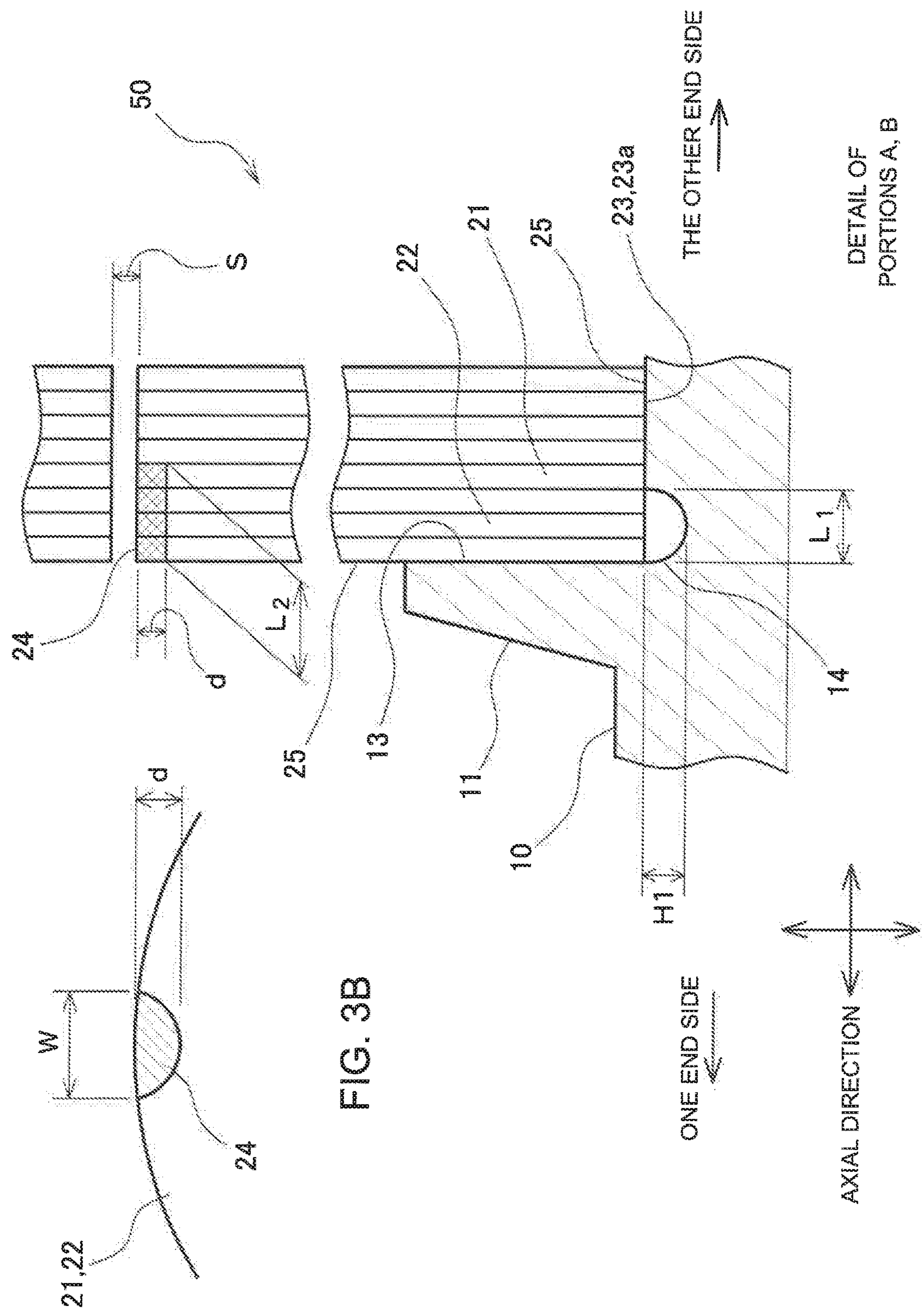
FIG. 3A is a view showing a portion A and a portion B shown in FIG. 1 in detail.
FIG. 3B is an enlarged view of a welded portion of the rotor core.

The shaft 10 has a hollow cylindrical shape having a center hole 18. The shaft 10 has an outer peripheral surface 15, a flange 11, a threaded portion 16, and a recessed portion 14. The flange 11 is formed on one end side of the shaft 10, and projects outward in the radial direction from the outer peripheral surface 15. The threaded portion 16 is formed on the other end side of the shaft 10 which is a side opposite to the flange 11. A nut 17 is threadedly engaged with the threaded portion 16, and the nut 17 fixes the rotor core 20 to the shaft 10. The recessed portion 14 is an annular groove formed on the outer peripheral surface 15 at a portion adjacent to a surface 13 of the flange 11 on a side of the rotor core 20. As shown in FIG. 3A, the length of the recessed portion 14 in the axial direction is set to L1, and the depth of the recessed portion 14 in the radial direction is set to H1.

Figure 2:
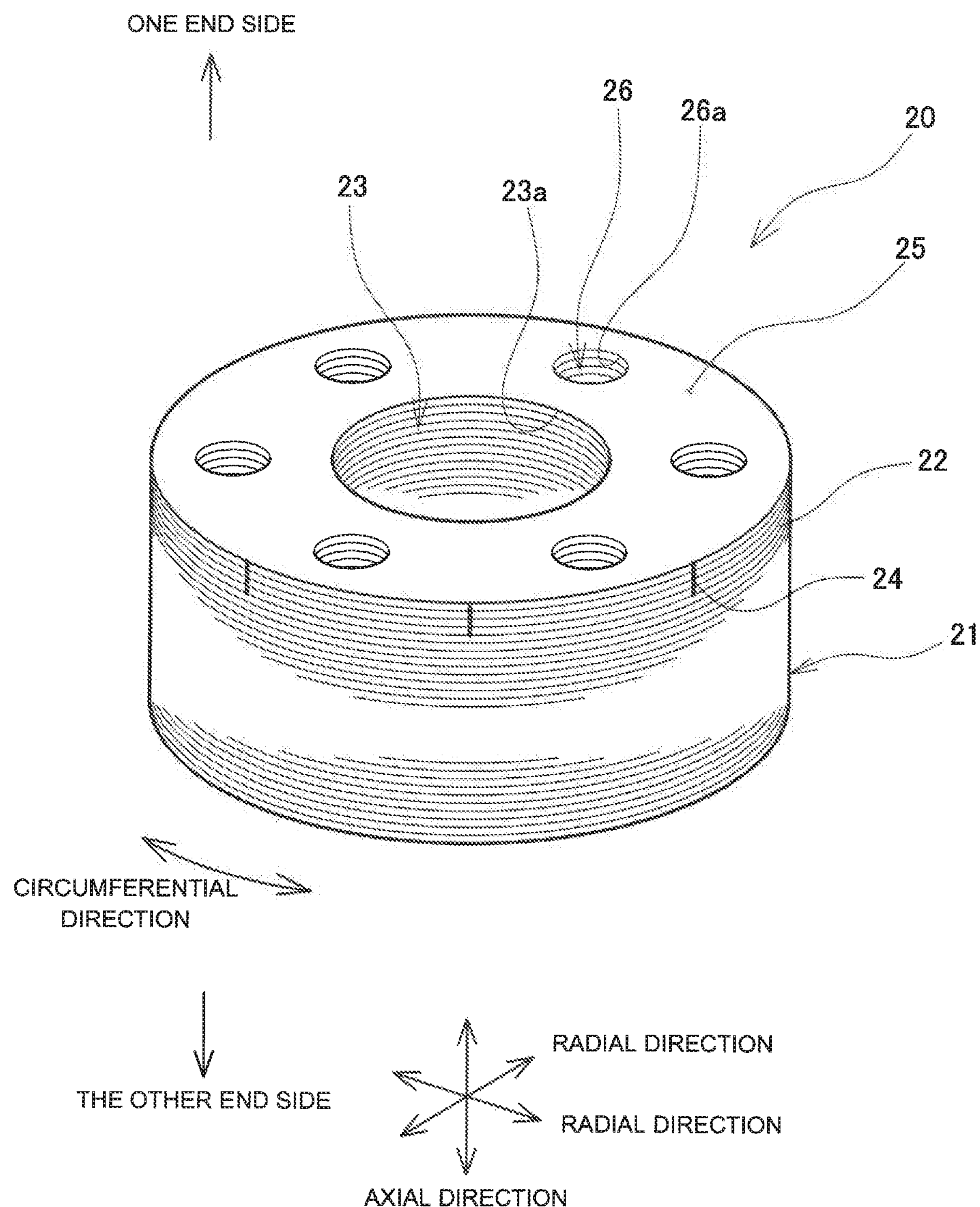
FIG. 2 is a perspective view of a rotor core to be incorporated into the rotor of the embodiment.

As shown in FIG. 2, the rotor core 20 is formed by laminating a plurality of disk-shaped first and second electromagnetic steel sheets 21, 22 in the axial direction. Each of the first and second electromagnetic steel sheets 21, 22 has a shaft through hole 23*a* at the center, and has a plurality of circular holes 26*a* at portions between the shaft through hole 23*a* and an outer periphery of the steel sheet. The shaft through hole 23*a* and the circular holes 26*a* are formed by punching the steel sheet. The shaft through hole 23*a* formed in first electromagnetic steel sheet 21 have the same size as the shaft through hole 23*a* formed in second electromagnetic steel sheet 22. And the circular holes 26*a* formed in first electromagnetic steel sheet 21 have the same size as the circular holes 26*a* formed in second electromagnetic steel sheet 22. Accordingly, when the first and second electromagnetic steel sheets 21, 22 are laminated to each other, the shaft through holes 23*a* form a fitting hole 23 into which the outer peripheral surface 15 of the shaft 10 is fitted, and the circular holes 26*a* form thickness reducing holes 26 which penetrate the rotor core 20 in the axial direction. When the rotor core 20 is assembled to the shaft 10, the second electromagnetic steel sheets 22 are positioned above the annular recessed portion 14 formed on the shaft 10, and the first electromagnetic steel sheets 21 are fitted on the outer peripheral surface 15 of the shaft 10. This configuration is described later.

As shown in FIG. 2, several second electromagnetic steel sheets 22 and at least one first electromagnetic steel sheet 21 are welded linearly in the lamination direction from an axial-direction end surface 25 of the rotor core 20 on one end side. A welded portion 24 is formed at several positions in the circumferential direction. As shown in FIG. 3A, the length of the welded portion 24 in the axial direction (the length of welding) is set to L2, and the depth of welding is set to d. The length L2 of the welded portion 24 in the axial direction is larger than the length L1 of the recessed portion 14 formed on the shaft 10 in the axial direction. As shown in FIG. 3B, each welded portion 24 has a sector shape as viewed in the axial direction. A width of the welded portion 24 along outer peripheries of the first and second electromagnetic steel sheets 21, 22 is set to W.

The rotor 50 is assembled in such a manner that the outer peripheral surface 15 of the shaft 10 is fitted into the fitting hole 23 of the rotor core 20, and the nut 17 is screwed to the shaft 10 from the other end side. As shown in FIG. 3A, when the rotor core 20 is assembled to the shaft 10, the axial-direction end surface 25 of the rotor core 20 on one end side comes into contact with the surface 13 of the flange 11 on a side of the rotor core 20. A plurality of second electromagnetic steel sheets 22; in this embodiment, three second electromagnetic steel sheets 22, are positioned above the annular recessed portion 14 formed on the shaft 10. The first electromagnetic steel sheets 21, which forms other electromagnetic steel sheets, are positioned on the outer peripheral surface 15 of the shaft 10. The shaft through hole 23*a* formed in the first electromagnetic steel sheets 21 are fitted on the outer peripheral surface 15 of the shaft 10 so that the first electromagnetic steel sheets 21 do not move in the radial direction. On the other hand, a gap is formed between the shaft through holes 23*a*, which are formed in the second electromagnetic steel sheets 22 positioned above the annular recessed portion 14, and an outer surface of the recessed portion 14. Accordingly, the second electromagnetic steel sheets 22 are not fitted on the shaft 10.

As described previously, the length L2 of the welded portion 24 of the rotor core 20 in the axial direction is larger than the length L1 of the recessed portion 14 formed on the shaft 10 in the axial direction. The second electromagnetic steel sheets 22 and the first electromagnetic steel sheets 21 are joined to each other in a lamination direction by welding such that the welding portion extends over the second electromagnetic steel sheets 22 and the first electromagnetic steel sheets 21. As described above, the second electromagnetic steel sheets 22 positioned above the annular recessed portion 14 are integrally joined to the first electromagnetic steel sheet 21, which is fitted on the outer peripheral surface 15. Accordingly, the position of the second electromagnetic steel sheets 22 in the radial direction is restricted by the first electromagnetic steel sheet 21. With such a configuration, there is no possibility of the second electromagnetic steel sheets 22 being displaced in the radial direction.

When a force to cause the second electromagnetic steel sheets 22 to move in the radial direction is applied to the second electromagnetic steel sheets 22 due to a centrifugal force, a torque, or the like, a shear force F in the radial direction is generated at the welded portion 24 between the second electromagnetic steel sheet 22 and the first electromagnetic steel sheet 21 (the welded portion 24 between the second electromagnetic steel sheet 22 at the third position counted from the axial-direction end surface 25 shown in FIG. 3 and the first electromagnetic steel sheet 21 at the fourth position counted from the axial-direction end surface 25). With such generation of a shear force F, a shear stress t is generated at the welded portion 24. A shear stress t generated at the welded portion 24 is expressed by "shear force F/cross-sectional area of welded portion 24." In this embodiment, a cross-sectional area of the welded portions 24 is obtained by multiplying an area of a sector portion indicated by hatching in FIG. 3B by the number of welded portions 24 in the circumferential direction. The cross-sectional area of the welded portions 24 is determined by the width W, the depth d, and the number of welded portions 24. The width W, the depth d, and the number of welded portions 24 are determined such that the welded portions 24 can sufficiently withstand a shear stress t generated at the welded portion 24. For example, the width W may be set to 1 mm to 2 mm, the depth d may be set to approximately 0.5 to 1 mm, and the number of welded portions 24 may be set to approximately 5 to 10.

Figure 4:
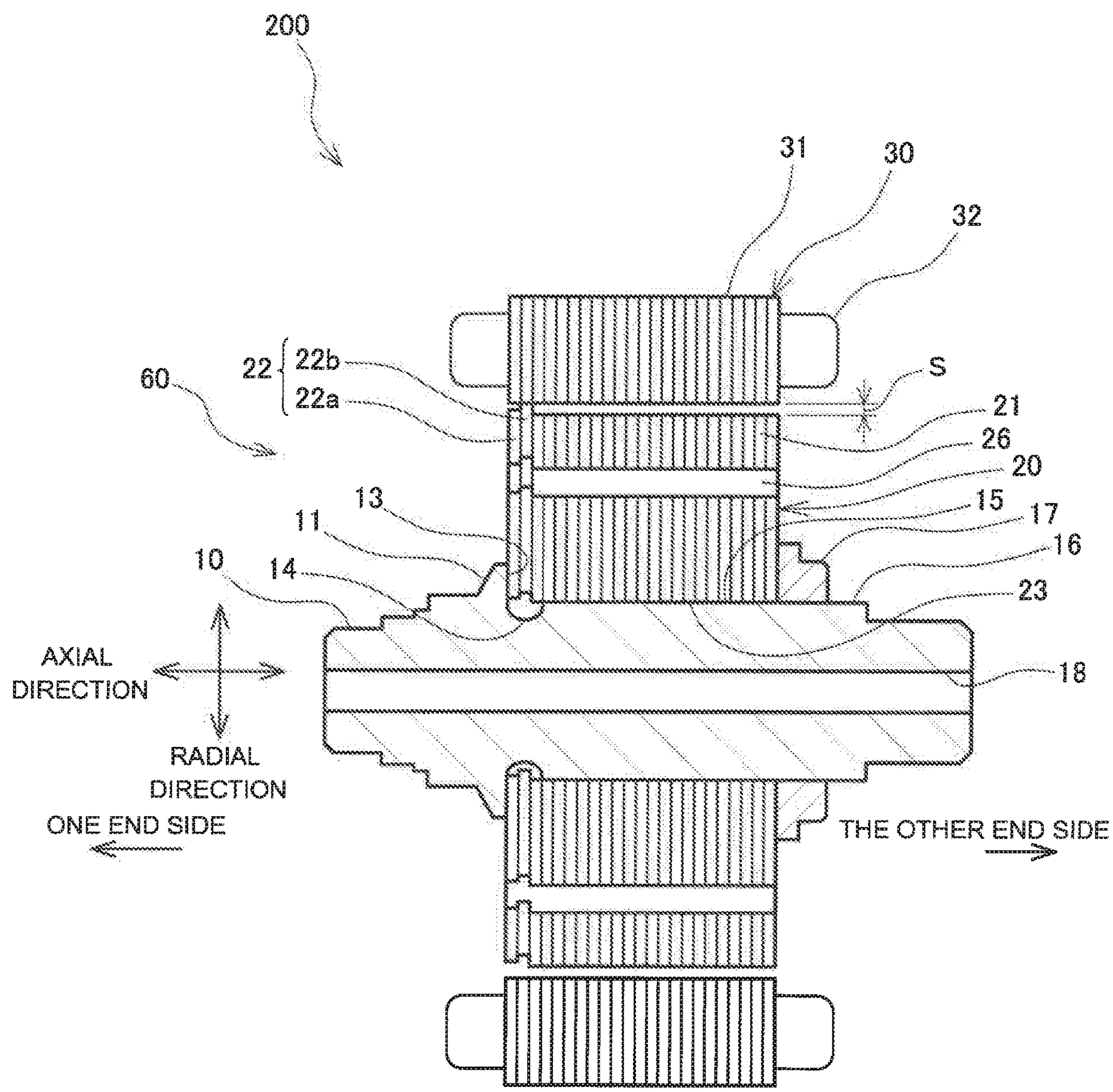
FIG. 4 is a schematic cross-sectional view of a motor into which a rotor of a comparison example is incorporated.

A motor 200 into which a rotor 60 of a comparative example is incorporated is described with reference to FIG. 4. Portions substantially equal to the corresponding portions described previously with reference to FIG. 1 to FIG. 3 are given the same reference characters, and the description of these portions is omitted.

The rotor 60 of the comparison example is formed such that second electromagnetic steel sheets 22 positioned above the annular recessed portion 14 and a first electromagnetic steel sheets 21 forming other electromagnetic steel sheets are not joined to each other by welding. Accordingly, when a force to cause the second electromagnetic steel sheets 22 to move in the radial direction is applied to the second electromagnetic steel sheets 22 due to a centrifugal force, a torque, or the like, second electromagnetic steel sheets 22*a*, 22*b* move in the radial direction as shown in FIG. 4. When an amount of radial movement of the steel sheet assumes a value equal to an air gap S formed between an outer periphery of the rotor core 20 and an inner periphery of a stator core 31, outer peripheries of the second electromagnetic steel sheets 22*a*, 22*b* interfere or come into contact with the inner periphery of the stator core 31.

On the other hand, in the motor 100 into which the rotor 50 of the embodiment described with reference to FIG. 1 to FIG. 3 is incorporated, the second electromagnetic steel sheets 22 positioned above the annular recessed portion 14 are integrally joined to the first electromagnetic steel sheet 21 fitted on the outer peripheral surface 15. Accordingly, the radial displacement of the second electromagnetic steel sheets 22 is suppressed so that the interference of the second electromagnetic steel sheets 22 with the stator core 31 is suppressed.

Next, a motor 110 into which a rotor 51 of another embodiment is incorporated is described with reference to FIG. 5. Portions substantially equal to the corresponding portions described previously with reference to FIG. 1 to FIG. 3 are given the same reference characters, and the description of these portions is omitted.

Figure 5:
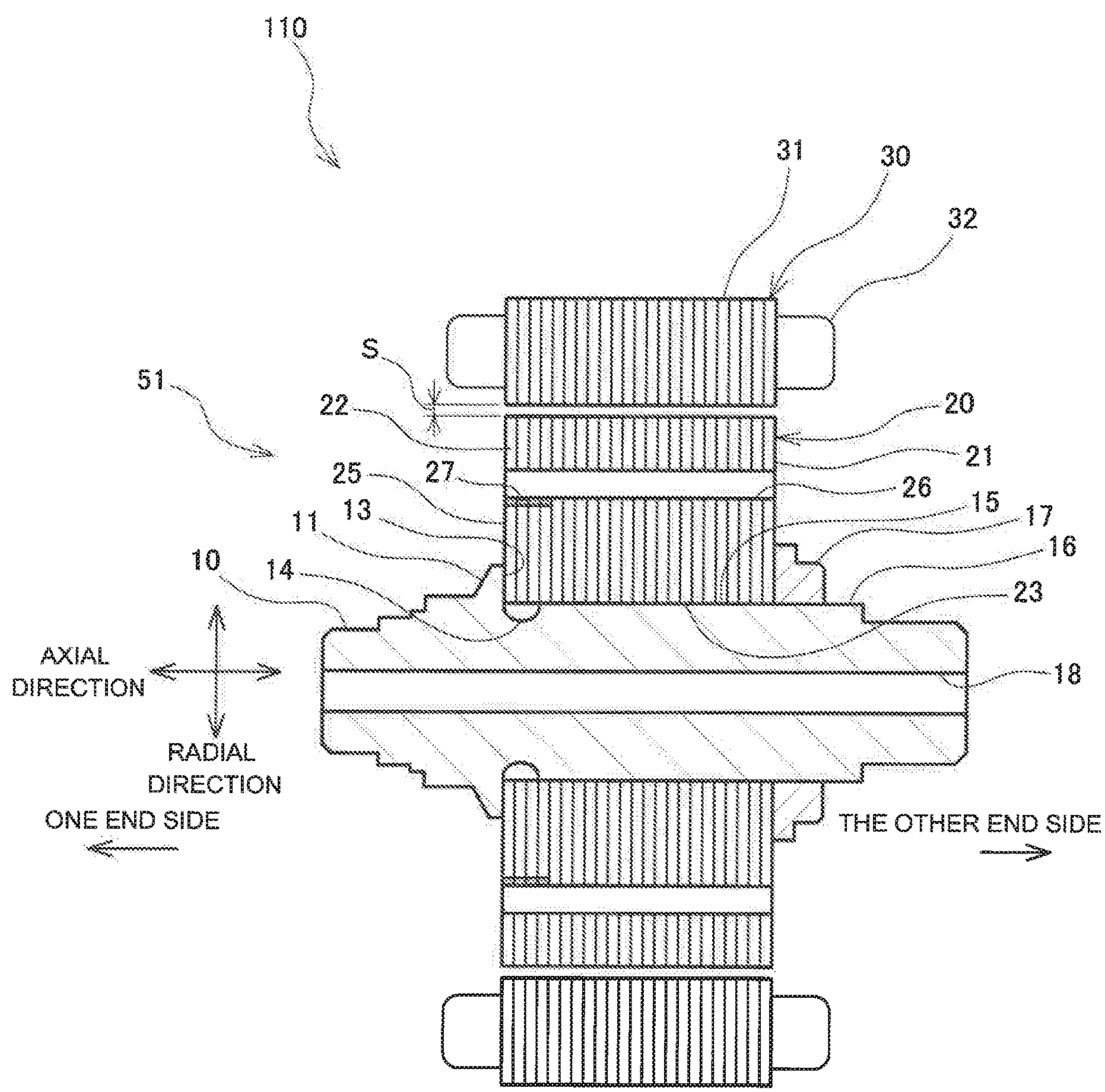
FIG. 5 is a schematic cross-sectional view of a motor into which a rotor of another embodiment is incorporated.

The rotor 51 shown in FIG. 5 is formed such that second electromagnetic steel sheets 22 positioned above the annular recessed portion 14 and a first electromagnetic steel sheets 21 forming other electromagnetic steel sheets are joined to each other by welding on an inner surface of each thickness reducing hole 26 formed in the rotor core 20 thus formed into an integral body. A shape of a welded portion 27 on the inner surface of the thickness reducing hole 26 is substantially equal to the shape of the welded portion 24 described with reference to FIG. 3.

In the same manner as the motor 100, into which the rotor 50 of the embodiment described previously is incorporated, also in the motor 110, into which the rotor 51 of this embodiment is incorporated, radial displacement of the second electromagnetic steel sheets 22 is suppressed so that the interference of the second electromagnetic steel sheet 22 with a stator core 31 is suppressed.

In the respective embodiments, the description has been made with respect to a case where three second electromagnetic steel sheets 22 are positioned above the annular recessed portion 14. However, such a configuration is merely for the sake of example. The number of second electromagnetic steel sheets 22 is not limited to three, and several second electromagnetic steel sheets 22 may be used. Further, the description has been made with respect to a case where the first and second electromagnetic steel sheets 21, 22 are integrally joined to each other by welding. However, this disclosure is not limited to such a configuration. For example, the first and second electromagnetic steel sheets 21, 22 may be integrally joined to each other by swaging or the like.

The invention claimed is:

1. A rotor, comprising:

a shaft provided with a flange which projects outward in a radial direction from an outer peripheral surface of the shaft; and a rotor core formed by laminating a plurality of electromagnetic steel sheets, the rotor core being fitted on the outer peripheral surface of the shaft such that an axial-direction end surface of the rotor core is in contact with the flange, wherein an annular recessed portion is formed on the outer peripheral surface of the shaft at a portion adjacent to a surface of the flange on a side of the rotor core, and two or more of the electromagnetic steel sheets positioned above the annular recessed portion and other electromagnetic steel sheets are joined to each other in a lamination direction by welding such that welding extends over two or more of the electromagnetic steel sheets positioned above the annular recessed portion and the other electromagnetic steel sheets, and a length of the welding is larger than a length of the recessed portion in an axial direction.

* * * * *